United States Patent

Hickey

[11] Patent Number: 5,979,401
[45] Date of Patent: Nov. 9, 1999

[54] INTERNAL COMBUSTION ENGINE HAVING INDUCTION SYSTEM WITH AERODYNAMIC CHARGE MOTION CONTROL VALVE

[75] Inventor: John Curtis Hickey, Belleville, Mich.

[73] Assignee: Ford Global Technologies, Inc., Dearborn, Mich.

[21] Appl. No.: 09/130,557

[22] Filed: Aug. 10, 1998

[51] Int. Cl.[6] .................................................. F02B 31/00
[52] U.S. Cl. ...................... 123/306; 123/337; 251/305
[58] Field of Search .............................. 123/188.14, 306, 123/308, 337, 432, 442; 251/305; 261/65

[56] References Cited

U.S. PATENT DOCUMENTS

| | | | |
|---|---|---|---|
| 3,437,320 | 4/1969 | Walker et al. | 261/41.5 |
| 3,442,489 | 5/1969 | Cary et al. | 251/305 |
| 3,485,476 | 12/1969 | Hemphill | 251/283 |
| 3,620,195 | 11/1971 | Lamm | 123/207 |
| 3,770,242 | 11/1973 | O'Connor, Jr. | 251/305 |
| 4,158,352 | 6/1979 | Blatter | 123/585 |
| 4,194,722 | 3/1980 | Okerblom | 251/305 |
| 4,336,776 | 6/1982 | Sumiyoshi et al. | 123/306 |
| 4,344,394 | 8/1982 | Showalter | 123/306 |
| 4,356,801 | 11/1982 | Graham | 123/337 |
| 4,420,438 | 12/1983 | Goosen | 261/65 |
| 4,438,745 | 3/1984 | Watanabe | 123/339.27 |
| 4,465,034 | 8/1984 | Tsutsumi | 123/306 |
| 4,774,750 | 10/1988 | Platusich | 29/890.127 |
| 5,069,175 | 12/1991 | Simko | 123/193.5 |
| 5,177,866 | 1/1993 | Bennett et al. | 29/890.127 |
| 5,275,375 | 1/1994 | Semence | 251/308 |
| 5,323,753 | 6/1994 | Cikanek, Jr. et al. | 123/593 |

*Primary Examiner*—Tony M. Argenbright
*Attorney, Agent, or Firm*—Jerome R. Drouillard

[57] ABSTRACT

An internal combustion engine having a cylinder and piston located therein has a charge motion control valve for controlling kinetic energy within an air charge flowing through an intake runner and into the cylinder of the engine. The charge motion control valve includes an actuator for controlling the position of the valve and an aerodynamic, wing-shaped valve disc being rotatable from a closed position to one or more open positions. The valve disc has leading and trailing segments. The leading segment masks airflow at small opening values of the valve and the trailing segment acts to prevent flow separation when the valve is in a wide-open throttle position.

11 Claims, 3 Drawing Sheets

INTERNAL COMBUSTION ENGINE HAVING INDUCTION SYSTEM WITH AERODYNAMIC CHARGE MOTION CONTROL VALVE

BACKGROUND OF THE INVENTION

1. Field of the Invention

The present invention relates to an engine having a charge motion control valve and induction system which will furnish charge air with high kinetic energy during most engine operating conditions.

2. Disclosure Information

In order to obtain maximum fuel economy with minimum tailpipe emissions, engine designers have striven for engines which tolerate both higher rates of exhaust gas recirculation (EGR) and lean of stoichiometric operation. One method for increasing an engine's tolerance to EGR while promoting highly stable combustion is to increase the combustion burn rate by increasing the kinetic energy or motion of the air charge entering the engine's cylinder. In this case, kinetic energy refers to translational, rotational, and vibrational motion of the air charge. In the past, designers have devised charge motion control valves comprising the familiar butterfly element, either used as a whole round plate situated within an intake runner, as shown in FIG. 8, or a plate having a cutout, as shown in FIGS. 9 and 10.

A problem with the valve plate shown in FIG. 8 is that flow passing over the upper and lower portions of the plate will recombine in trailing vortices, causing loss of downstream energy and velocity as air passes through the intake port and into the cylinder. In other words, the streamlines are not maintained, but are destroyed passing over the plate. FIG. 9 illustrates a plate having a cutout formed in one section thereof, and although the streamlines are maintained at one portion of the intake runner, there is a loss of energy caused by the sharp edged orifice cutout, which causes trailing vortices. FIG. 10, which is also prior art, illustrates a half plate which, once again, suffers from the problem that when the plate is in the fully opened position, air flowing above and below the plate combines into turbulent eddys which reduce flow through the port downstream of the plate. This is undesirable.

The foregoing defects of prior art systems are remedied by a charge motion control valve (CMCV) according to the present invention.

SUMMARY OF THE INVENTION

An internal combustion engine includes at least one cylinder and at least one intake runner for providing charge air to the cylinder. A poppet valve, located in one end of the intake runner, admits charge air into the cylinder, and a charge motion control valve controls kinetic energy within the charge air flowing through the intake runner. The charge motion control valve preferably comprises an actuator for controlling the position of the charge motion control valve and an aerodynamic, wing-shaped valve disc being rotatable from a closed position to one or more open positions.

The valve disc is operatively connected with the actuator. The valve disc preferably comprises a leading segment facing upstream when the valve disc is in its open position, with the leading segment being configured such that at small openings of the charge motion control valve, air flow past the leading segment is masked, and a trailing segment facing downstream when the valve disc is open. The trailing segment is configured such that when the valve disc is in a fully open position, air flow past the valve disc remains attached to the valve disc. In this regard, it is noted that the term "attached" means not that the air adheres to the valve, but rather that the streamlines, in the classic aerodynamic sense, do not separate from the valve, and as a consequence, trailing vortices are not formed with their attendant drag and loss of kinetic energy and flow throughput.

According to another aspect of the present invention, a charge motion control valve further comprises a nozzle formed in the valve disc, with the nozzle having a converging portion facing upstream when the valve disc is closed and a discharge portion facing downstream when the valve disc is closed. Air which passes through the nozzle when the valve disc is in its closed position and over the trailing and leading segments and through the nozzle when the valve disc is in a partially open position is directed along the same portion of the intake runner. In this fashion, the flow through the nozzle and past the valve disc reinforce one another, with the result that very high kinetic energy and therefore charge motion levels are possible with a system according to the present invention.

A valve disc according to the present invention is preferably molded integrally with a rotatable shaft. Plastic is one preferred material for the present valve disc and shaft assembly.

An actuator according to the present invention may comprise a DC motor or a stepper motor controlled by an engine controller.

DETAILED DESCRIPTION OF PREFERRED EMBODIMENTS

Figure 1:
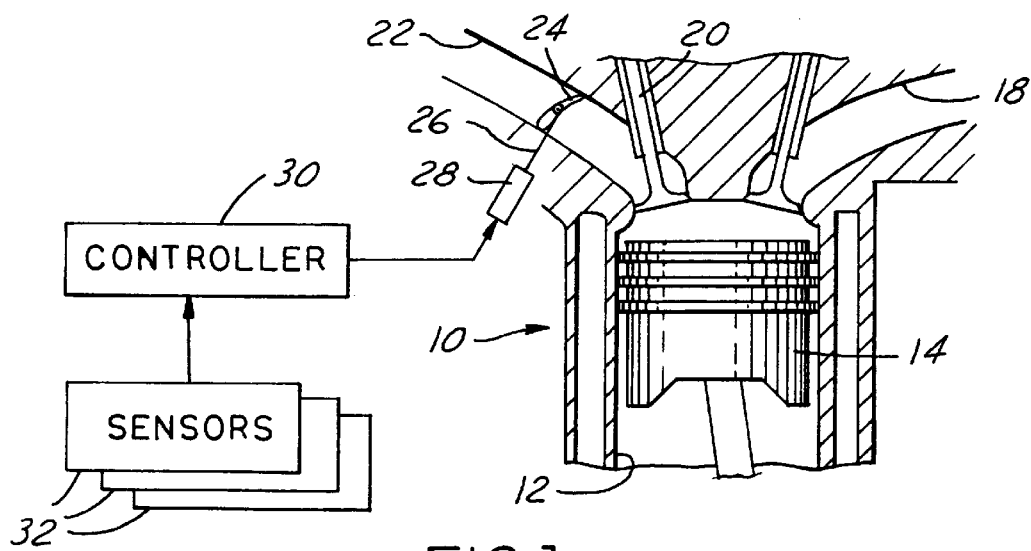
FIG. 1 is a schematic representation of an internal combustion engine having an aerodynamic charge motion control valve according to the present invention.

As shown in FIG. 1, engine 10, having cylinder 12 and piston 14, has exhaust valve 16 for letting spent gases out of cylinder 12 through exhaust runner 18. Air charge is admitted into engine 10 by intake poppet valve 20 and intake runner 22. Valve disc 24 is positioned within intake runner 22. Valve disc 22 is mounted upon shaft 26, which is inserted into runner 22. Shaft 26 is positioned by actuator 28. As a result, actuator 28 positions valve disc 24.

Controller 30 operates actuator 28 so as to ultimately control the position of valve disc 24. Controller 30 is connected to a bank of sensors 32 which provide information regarding such engine operating parameters as throttle position, engine air/fuel ratio, spark timing, engine speed, engine load, and other operating parameters known to those skilled in the art and suggested by this disclosure. Controller 30 may comprise either a powertrain control module, an engine control module, or other type of automotive microprocessor based engine controller known to those skilled in the art and suggested by this disclosure.

Actuator 28 may comprise either a DC motor having external position feedback or a stepper motor, or other type of vacuum or electrodrive motor known to those skilled in the art of engine actuators and suggested by this disclosure.

Figure 2:
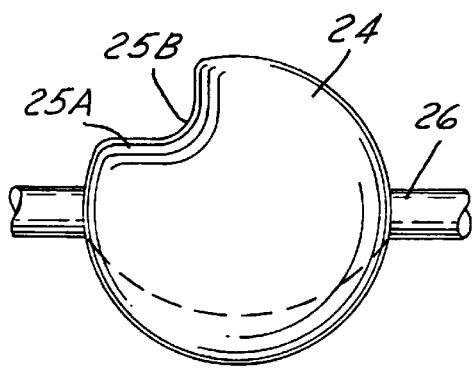
FIG. 2 illustrates a CMCV and shaft assembly according to one aspect of the present invention.
Figure 3:
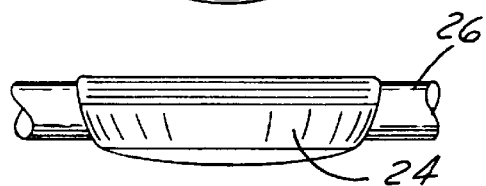
FIG. 3 is a sectional view of the valve disc according to the present invention taken along the line 3—3 of FIG. 2.

As shown in FIG. 2, valve disc 24 may be shaped with a generally circular configuration and is attached to, if not integral with, shaft 26. Although a preferred embodiment would be to mold valve disc 24 and shaft 26 as a single component, preferably of plastic, those skilled in the art will appreciate in view of this disclosure that other types of single and multipiece designs could be employed with a system according to the present invention.

Valve disc 24 has a nozzle formed therein which is shown with particularity in FIG. 2. Nozzle 25 in effect has a converging portion 25A facing upstream when valve disc 24 is in the closed position as in FIG. 5, and a discharge portion 25B which faces downstream when valve disc 24 is closed. The fact that valve disc 24 is an airfoil section having a thickness which is far greater than the thickness of conventional CMCV valve plates allows nozzle 25A to be formed in plate 24 with the result that the flow of air through nozzle 25 requires much less energy than would the flow of a like amount of air through a conventional plate in which merely a quarter of the plate is cut out. In effect, plate 24 allows for nozzle 25A to be three dimensional, whereas conventional cutouts comprise only two dimensional flow control devices.

Figure 4:
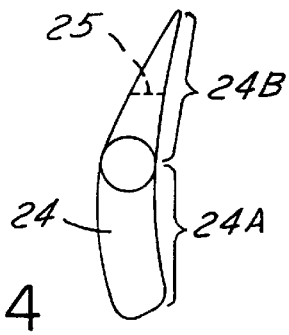
FIG. 4 is a sectional view of a valve disc and shaft assembly according to the present invention taken along the line 4—4 of FIG. 2.

Valve disc 24 is an airfoil section having shape characteristics which are described with particularity in U.S. National Advisory Committee on Aeronautics (NACA) literature. FIG. 4 illustrates component segments of valve disc 24. Leading segment 24A corresponds to the leading segment of a wing section, and trailing segment 24B corresponds to the trailing segment of a wing.

Figure 5:
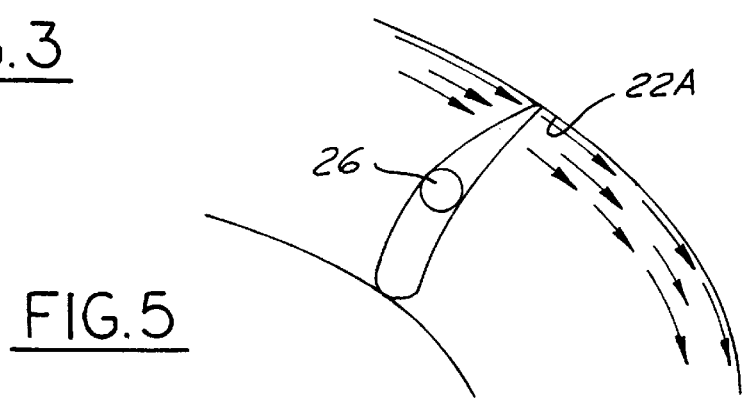
FIG. 5 illustrates flow past a CMCV according to the present invention when the CMCV is in its closed position.

FIG. 5 illustrates flow past valve disc 24 when the CMCV is in the fully closed position. Notice from FIG. 5 that air flows smoothly through nozzle 25 and remains attached to upper wall 22A of port runner 22, thereby creating and maintaining a high level of kinetic energy for air flowing into the cylinder.

Figure 6:
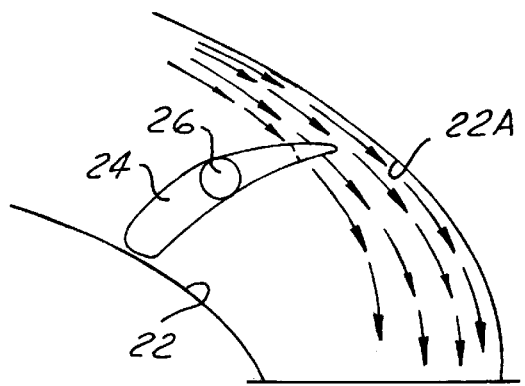
FIG. 6 is similar to FIG. 5 but shows a CMCV according to the present invention open approximately 10°.

FIG. 6 illustrates valve disc 24 in a partially open position. Here, as shown by the illustrated streamlines, air is free to flow between valve disc 24 and upper wall 22A of port runner 22. Additional air will also be allowed to flow through nozzle 25. These flows will combine and remain smoothly attached to upper wall 22A of port 22. Notice also that the segment 24A of disc 24 masks the flow between segment 24A and the adjoining wall of port runner 22, with the result that air is not permitted to flow between segment 24A and the wall of port runner 22. As a further result, flow is predominantly past the upper portion 22A of runner 22 and the high kinetic energy is maintained, rather than being lost due to turbulence. As used herein, the term "mask" refers to the fact that segment 24A of disc 24 is maintained in very close proximity to the adjacent wall of runner 22, so as to occlude the flow of air past disc 24 in that area.

Figure 7:
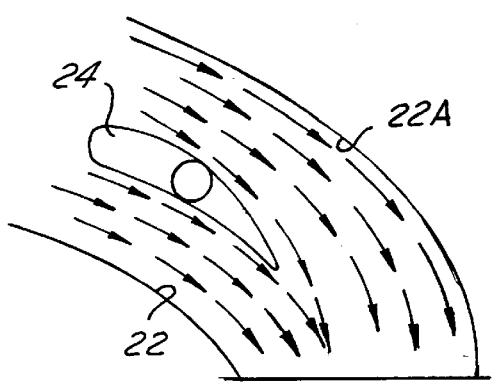
FIG. 7 illustrates a CMCV according to the present invention in its fully open position.

FIG. 7 illustrates valve disc 24 in a fully open position. Here it is noted that the streamlines smoothly flow past valve disc 24 and recombine on the downstream edge of valve 24. In this way, maximum kinetic energy is preserved. Because valve disc 24 has the section characteristics of a wing, the airflow cleanly passes over valve disc 24 without separation and turbulent drag. Accordingly, valve disc 24 causes much less restriction to airflow than do conventional discs.

Figure 8:
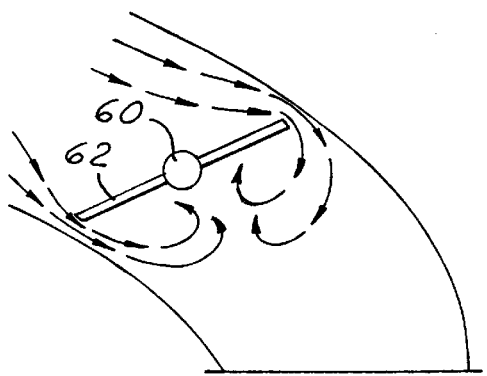
FIGS. 8–10 illustrate prior art CMCVs having deficiencies which are remedied by a system according to the present invention.
Figure 9:
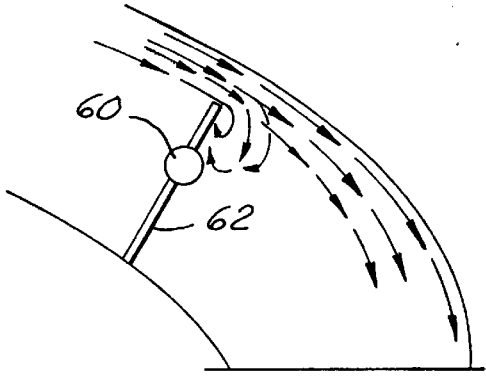
Figure 10:
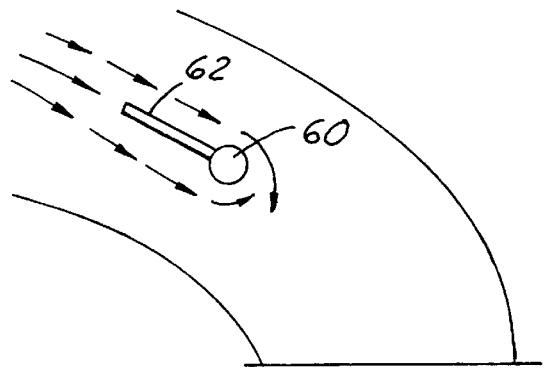
Figure 11:
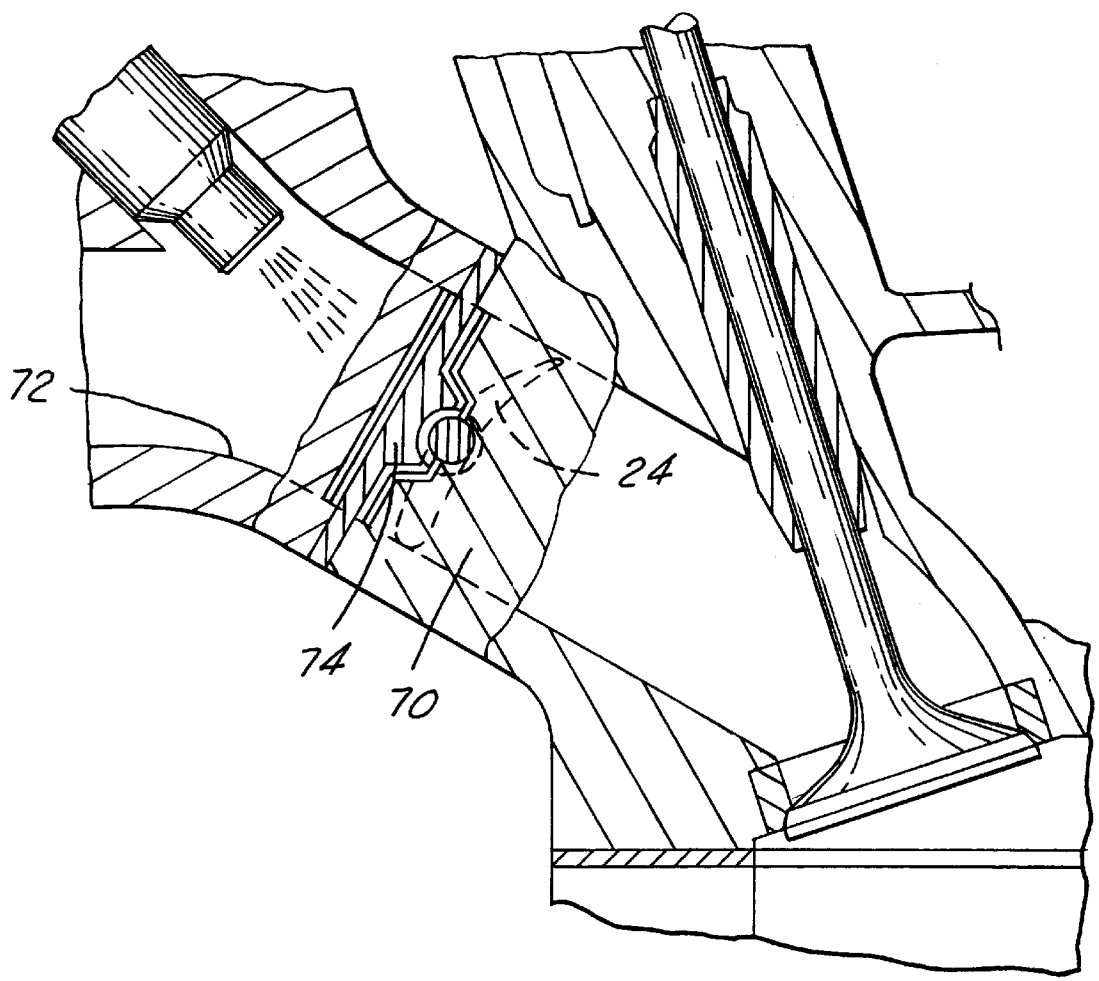
FIG. 11 illustrates a CMCV mounted in a special carrier gasket between a cylinder head and intake manifold according to another aspect of the present invention.

The energy conservation results provided by a system according to the present invention may be contrasted with those of prior art systems with the aid of FIGS. 8–10. FIG. 8 illustrates a full plate CMCV having trailing vortices behind the plate when the plate is in a partially open position. Notice that the flows combine on the backside of the plate and decay into eddys or vortices which partially consume the kinetic energy in the flow. Similarly, with FIG. 9, although the plate is open on but one side, for example, a cutaway plate, and there is no combination of flows from opposite sides of the plate, the fact is that the flow deteriorates somewhat into trailing vortices because the hole through the plate is not aerodynamic. In other words, there is no nozzle through the plate. Finally, FIG. 10 shows a half-plate CMCV which again has flow combination, trailing vortices, and eddys on its downstream side. As a result, plate 62 and shaft 60 produce a great deal of turbulence in the fully open position and this hampers production by the engine at wide-open throttle conditions.

FIG. 10 illustrates that a CMCV according to the present invention may be mounted between intake runner 72 and cylinder head 70 with the aid of carrier gasket 74.

While the invention has been shown and described in its preferred embodiments, it will be clear to those skilled in the arts to which it pertains that many changes and modifications may be made thereto without departing from the scope of the invention.

What is claimed is:

1. An internal combustion engine comprising: at least one cylinder;

at least one intake runner for providing charge air to the cylinder;

a poppet valve, located in one end of the intake runner, for admitting charge air into the cylinder;

a charge motion control valve for controlling the kinetic energy within charge air flowing through the intake runner, with the charge motion control valve comprising:

an actuator for controlling the position of the charge motion control valve;

an aerodynamic, wing-shaped valve disc being rotatable from a closed position to one or more open positions, with the valve disc being operatively connected with the actuator, and with the valve disc comprising:

a leading segment, facing upstream when the valve disc is in its open position, with the leading segment being configured such that at small openings of the charge motion control valve, flow past the leading segment is masked; and a trailing segment, facing downstream when the valve disc is open, with the trailing segment being configured such that when the valve disc is in a fully open position, airflow past the valve disc remains attached to the valve disc.

2. An engine according to claim 1, wherein said charge motion control valve further comprises a nozzle formed in the valve disc, with the nozzle having a converging portion facing upstream when the valve disc is closed and a discharge portion facing downstream when the valve disc is closed.

3. An engine according to claim 2, wherein flow passing through said nozzle when the valve disc is in its closed position and over the trailing segment and through the nozzle when the valve disc is in a partially open position is directed along the same portion of the intake runner.

4. An engine according to claim 1, wherein said valve disc is mounted upon a rotatable shaft operatively connected with said actuator, with said valve disc having a maximum thickness corresponding to the thickness of the shaft.

5. An engine according to claim 4, wherein said valve disc is molded integrally with said shaft.

6. An engine according to claim 5, wherein said valve disc and said shaft are molded of plastic material.

7. An engine according to claim 1, wherein said actuator comprises a dc motor.

8. An engine according to claim 1, wherein said actuator comprises a stepper motor.

9. An engine according to claim 4, wherein the shaft and valve disc are mounted between said intake runner and a cylinder head which houses said poppet valve.

10. An internal combustion engine comprising:
at least one cylinder;
at least one intake runner for providing charge air to the cylinder;
a poppet valve, located in one end of the intake runner, for admitting charge air into the cylinder; and
a charge motion control valve for controlling the kinetic energy within charge air flowing through the intake runner, with the charge motion control valve comprising:

a motor driven actuator for controlling the position of the charge motion control valve;
an aerodynamic, shaft-mounted, wing-shaped valve disc being rotatable from a closed position to one or more open positions, with the valve disc being operatively connected with the actuator, and with the valve disc comprising:
a leading segment, facing upstream when the valve disc is in its open position, with the leading segment being configured such that at small openings of the charge motion control valve, flow past the leading segment is masked;
a trailing segment, facing downstream when the valve disc is open, with the trailing segment being configured such that when the valve disc is in a fully open position, airflow past the valve disc remains attached to both sides of the valve disc and recombines without trailing vortices; and
a nozzle formed in the valve disc, with the nozzle having a converging portion facing upstream when the valve disc is closed and a discharge portion facing downstream when the valve disc is closed.

11. An engine according to claim 10, wherein said trailing segment comprises an airfoil.

* * * * *